United States Patent [19]
Epstein

[11] Patent Number: 5,647,877
[45] Date of Patent: Jul. 15, 1997

[54] SOLAR ENERGY GASIFICATION OF SOLID CARBONACEOUS MATERIAL IN LIQUID DISPERSION

[75] Inventor: Michael Epstein, Rishon-LeZion, Israel

[73] Assignee: Yeda Research and Development Company Limited, Rehovot, Israel

[21] Appl. No.: 420,767

[22] Filed: Apr. 12, 1995

Related U.S. Application Data

[63] Continuation-in-part of Ser. No. 270,676, Jun. 22, 1994, abandoned, which is a continuation of Ser. No. 996,170, Dec. 23, 1992, abandoned.

[51] Int. Cl.$^6$ ........................................... C10J 3/46
[52] U.S. Cl. ..................... 48/210; 48/197 R; 48/209; 48/DIG. 9; 585/240
[58] Field of Search ........................ 48/197 R, 202, 48/206, 210, 209, DIG. 9, DIG. 7; 252/373; 585/240, 241

[56] References Cited

U.S. PATENT DOCUMENTS

| | | | |
|---|---|---|---|
| 2,619,451 | 11/1952 | Ogorzaly et al. | 48/206 |
| 2,868,631 | 1/1959 | Woebcke | 48/206 |
| 3,933,458 | 1/1976 | Antal | 48/DIG. 9 |
| 3,957,460 | 5/1976 | Lee | 48/197 R |
| 3,993,458 | 11/1976 | Antal, Jr. | 48/209 |
| 4,059,416 | 11/1977 | Matovich | 48/197 R |
| 4,177,120 | 12/1979 | Zenty | 48/DIG. 9 |
| 4,229,184 | 10/1980 | Gregg | 48/DIG. 9 |
| 4,290,779 | 9/1981 | Frosch et al. | 48/99 |
| 4,403,601 | 9/1983 | Hunt | 126/435 |
| 4,415,339 | 11/1983 | Aiman et al. | 48/62 R |
| 4,424,065 | 1/1984 | Langhoff et al. | 48/197 R |
| 4,455,153 | 6/1984 | Jakahi | 48/62 R |
| 4,502,633 | 3/1985 | Saxon | 239/132.3 |
| 4,588,478 | 5/1986 | Warzel | 48/DIG. 9 |
| 4,643,809 | 2/1987 | Botts et al. | 204/155 |
| 4,773,918 | 9/1988 | Kohl | 48/197 R |

OTHER PUBLICATIONS

T. Reed, "Problems . . . Solar Energy in Biomass, Pyrolysis and Gasification" Nov. 1979, SERI/TP-333-495.
Bjerle et al., "Gasification of Swedish Black Shale in the Fluidized Bed. Reactivity in Steam and Carbon Dioxide Atmosphere", Ind. Eng. Chem. Process Des. Dev., 1980, 19, pp. 345-351.
Kaminsky et al., "Fluidized Bed Pyrolysis of Oil Sand and Oil Shale", Ger. Chem. Eng., 6, 1983, pp. 306-311.
Gregg et al., "Solar Gasification of Coal, Activated Carbon, Coke and Coal and Biomass Mixtures", Solar Energy, 1980, vol. 25, pp. 353-364.
Taylor et al., "Solar Gasification of Carbonaceous Materials", Solar Energy, vol. 30, No. 6, 1983, pp. 513-525.
Beattie et al, "High-Temperature Solar Pyrolysis of Coal", Solar Engery, vol. 31 No. 2, 1983, pp. 137-143.
Bruckner, "Continuous Duty Solar Coal Gasification System Using Molten Slag And Direct-Contact Heat Exchange", Solar Energy, vol. 34, No. 3, 1985, pp. 239-247.
Lalvani, "Lignin-Augmented Coal Depolymerization under Mild Reaction Conditions", Energy & Fuels, 1991, 5 pp. 347-352.

*Primary Examiner*—Timothy McMahon
*Attorney, Agent, or Firm*—Foley & Lardner

[57] ABSTRACT

Use of solar energy for the production of synthesis gas from carbonaceous material. An aqueous dispersion of carbonaceous material is injected into a reactor in the form of a shower or a jet of droplets, and the droplets are allowed to sink inside the reactor across a high-temperature focal zone projected into the reactor by means of a system for the concentration of solar radiation. The residence time inside the reactor is adjustable by means of a countercurrent gas flow or by the injection of two or more discrete droplet jets in an impinging jet arrangement.

14 Claims, 3 Drawing Sheets

SOLAR ENERGY GASIFICATION OF SOLID CARBONACEOUS MATERIAL IN LIQUID DISPERSION

This application is a continuation-in-part of patent application Ser. No. 08/270,676, filed Jun. 22, 1994 now abandoned, which is a Continuation application of patent application Ser. No. 07/996,170, filed Dec. 23, 1992, now abandoned.

FIELD OF THE INVENTION

The present invention concerns a process of gasification of solid carbonaceous materials, e.g., coal, dispersed in water. The main product of this process, which contains mainly hydrogen and carbon monoxide and, depending upon the nature of the carbonaceous raw material used, may also contain a variety of low molecular olefins and paraffins as well as various other compounds, will be referred to hereinafter as "synthesis gas" or "syngas". Synthesis gas which contains hydrogen and carbon monoxide, is a valuable feedstock for the petrochemical industry serving for the production of a variety of products such as methanol, synthetic fuels, fuel additives and the like.

BACKGROUND OF THE INVENTION AND PRIOR ART

Conventionally coal gasification is based on the reaction of coal, steam and oxygen (or air) to form a gaseous product composed mainly of carbon monoxide and hydrogen. In this reaction about half the amount of the feed carbon is consumed by burning in order to provide the energy required for the gasification of the other half. The burning is brought about by feeding oxygen or air to the coal bed.

Similar processes for the production of synthesis gas by the gasification of oil shales and methane have also been reported.

It has already been suggested to use concentrated solar energy as the heat source for the production of synthesis gas by the pyrolysis of carbonaceous material such as coal, oil shales and waste polymers. Use of this source of energy has the advantage that no combustion is required and consequently virtually all the carbonaceous material fed into the process is pyrolised. Additionally, due to the fact that no combustion occurs the process is environmentally clean.

Thus I. Bjerie et al., *Ind. Eng. Chem. Process Des. Dev.* 19 (1980), 345, D. W. Gregg et al., Lawrence Livermore Laboratory Report UCRL-52930 May 1980 and W. Kaminsky et al., *Ger. Chem. Eng.*, 6 (1983) 306, have all reported the gasification of oil shale with various degrees of success.

D. W. Gregg et al., *Solar Energy* 25 (1980), 353, reported the solar energy gasification of coal in a 23 Kw solar furnace. According to that report, a fixed bed of coal within the reactor fitted with a silica glass window was illuminated by concentrated solar light penetrating through the window. Steam or $CO_2$ was passed through the bed and reacted endothermally with the coal. The major drawback of such a process is the fact that the absorption of solar radiation occurs within a thin outermost layer, whereas the bulk part of the bed may be heated only indirectly. Therefore, only low process efficiencies were reported.

R. W. Taylor et al., *Solar Energy* 30, (1983), 513 W. H. Beattie et al., *Solar Energy*, 31 (1983), 137, reported experiments for coal gasification in a small reactor fitted with a quartz window. In fixed bed experiments the decomposition temperature produced by the concentrated solar radiation were about 1800°–2500° C. Only about 50 percent of the coal was volatilized yielding a mixture of $H_2$, $H_2O$, $CH_4$, $CO_2$, $C_2H_4$ and $C_2H_6$. Similar results were obtained with other carbonaceous materials such as charcoal, wood and paper.

In fluidized bed experiments the decomposition temperature were about 750°–1000° C. and here too yields were unsatisfactory.

A different, indirect system of solar coal gasification was proposed by A. P. Bruckner, *Solar Energy*, 34 (1985), 239. As reported there, a feed gas (steam or $CO_2$) was heated to temperatures above 1200° C. in direct heat exchange with slag droplets melted in a central solar heater. The so-heated feed gas was then reacted with pulverized coal in conventional reactors. Thermal storage was provided by a refractory-lined, insulated vessel, containing solar-molten slag which could be used during the night.

In a very recent work by S. B. Lalvani et al, *Energy and Fuels*, 5 (1991), 347, it was shown that if coal is mixed with lignin there results a synergistic effect which enhances the solar energy gasification.

While all these reported processes for the production of synthesis gas from carbonaceous starting material with the use of solar energy are ecologically superior to the conventional processes in that no burning takes place and accordingly no combustion gasses are delivered to the atmosphere, and while they have the further advantage of yielding a product of higher energetic content, they are still unsatisfactory yield-wise in that significant fractions of the carbonaceous material fed into the process are not pyrolized.

It is accordingly the object of the present invention to provide a new process for the production of synthesis gas from carbonaceous material by solar gasification.

SUMMARY OF THE INVENTION

In accordance with the present invention there is provided a gasification process for the production of synthesis gas using solar energy, comprising:

providing a solar gasifying reactor capable of admitting concentrated solar radiation and having top and bottom regions;

directing concentrated solar radiation into said gasifying reactor to produce a high-temperature focal zone therein;

continuously injecting into said gasifying reactor an aqueous dispersion holding particulate carbonaceous material enclosed within water droplets so that the droplets sink across said focal zone, under conditions which ensure a desired residence time of said particulate carbonaceous material therein; and withdrawing product synthesis gas from the reactor.

In accordance with one embodiment of the invention the said aqueous dispersion is injected into the top region of the gasifying reactor and the droplets sink therein by gravity across said focal zone. In the performance of this embodiment, a suitable gas such as steam, carbon dioxide or recycled product synthesis gas is injected into the bottom region of the reactor to produce therein a gas flow countercurrent to the sinking droplets. By judicious adjustment of the intensity of such countercurrent gas flow, the residence time of individual carbonaceous material particles within the reactor may be controlled according to requirements.

In the performance of this embodiment of the invention, the injection of the aqueous dispersion of carbonaceous material into the top region of the reactor is performed in such a way that the injected dispersion disintegrates into a shower or cloud of small droplets or into an array of discrete jets of droplets, whereby the interaction between each particle and the impinging concentrated solar radiation is maximized. This is achieved by using suitably designed nozzles which may be simple holes or cylindrical or conical tubular bodies.

In accordance with another embodiment of the invention, the said aqueous dispersion is injected into the said focal zone in form of at least two discrete jets of droplets in an impinging jet arrangement so as to cause the injected droplets to collide with each other. In the performance of this embodiment the residence time can be controlled by judicious adjustment of injection parameters.

The reactor may be made entirely of a transparent material physically and chemically stable when exposed to concentrated, high temperature solar radiation, or else be fitted with a window made of such material, e.g. quartz.

If desired, any non-reacted particulate carbonaceous material arriving at the bottom region of the reactor is recycled.

A variety of carbonaceous materials may be used in the process according to the invention such as, for example, various types of native coal, charcoal, oil shales, various biomasses, waste polymeric materials and the like, and any combination thereof. Depending on the nature of the raw material used for the process, the product synthesis gas may, in addition to hydrogen and carbon monoxide, also contain a variety of low molecular paraffins and olefins.

The invention further provides installation for the production of synthesis gas from carbonaceous material comprising means for the concentration of solar radiation;

a solar gasifying reactor having top and bottom regions and at least a transparent portion capable of transmitting concentrated solar radiation;

means for focusing concentrated solar radiation into the reactor to form therein a high temperature focal zone;

nozzle means;

means for the injection of an aqueous dispersion of particulate carbonaceous material into the reactor via said nozzle means; and exhaust means for withdrawing product synthesis gas from the reactor.

In the course of operation the solid carbonaceous material particles inside the water droplets absorb the radiation and are heated very rapidly to a high temperature. The bulk of the water surrounding the particles remains practically cold except for a thin film that envelopes the particles which interacts with the solid particles to produce the synthesis gas.

The product synthesis gas exhausted from the reactor is preferably passed through a separation device such as a cyclone, to separate unreacted particles or droplets of liquid.

The said means for the injection of a dispersion of particulate carbonaceous material into the reactor via said nozzle means may be suitable pumping means such as a pressurizing slurry pump. Alternatively, an overhead tank may be provided from which the dispersion flows by gravity into the reactor via said nozzle means. Preferably such an overhead tank is of the constant-head type.

Preferably, the bottom region of the reactor according to the invention is fitted with means for the injection of a suitable gas such as for example, steam, carbon dioxide or recycled gaseous product, to produce a gas flow in counter-current to the gravity flow of the droplets or jets of the water dispersion of carbonaceous material, whereby the residence time of the carbonaceous particles in the reactor is judiciously controlled.

If desired, the reactor according to the invention may be associated with means for recycling unreacted carbonaceous material accumulating at the bottom region of the reactor.

Preferably, separator means such as, for example, a cyclone are associated with the product gas exhaustion means so as to separate therefrom any entrapped liquid or solid material.

DESCRIPTION OF THE DRAWINGS

For better understanding the invention will now be described with reference to the next drawings in which.

DESCRIPTION OF A SPECIFIC EMBODIMENT

Figure 1:
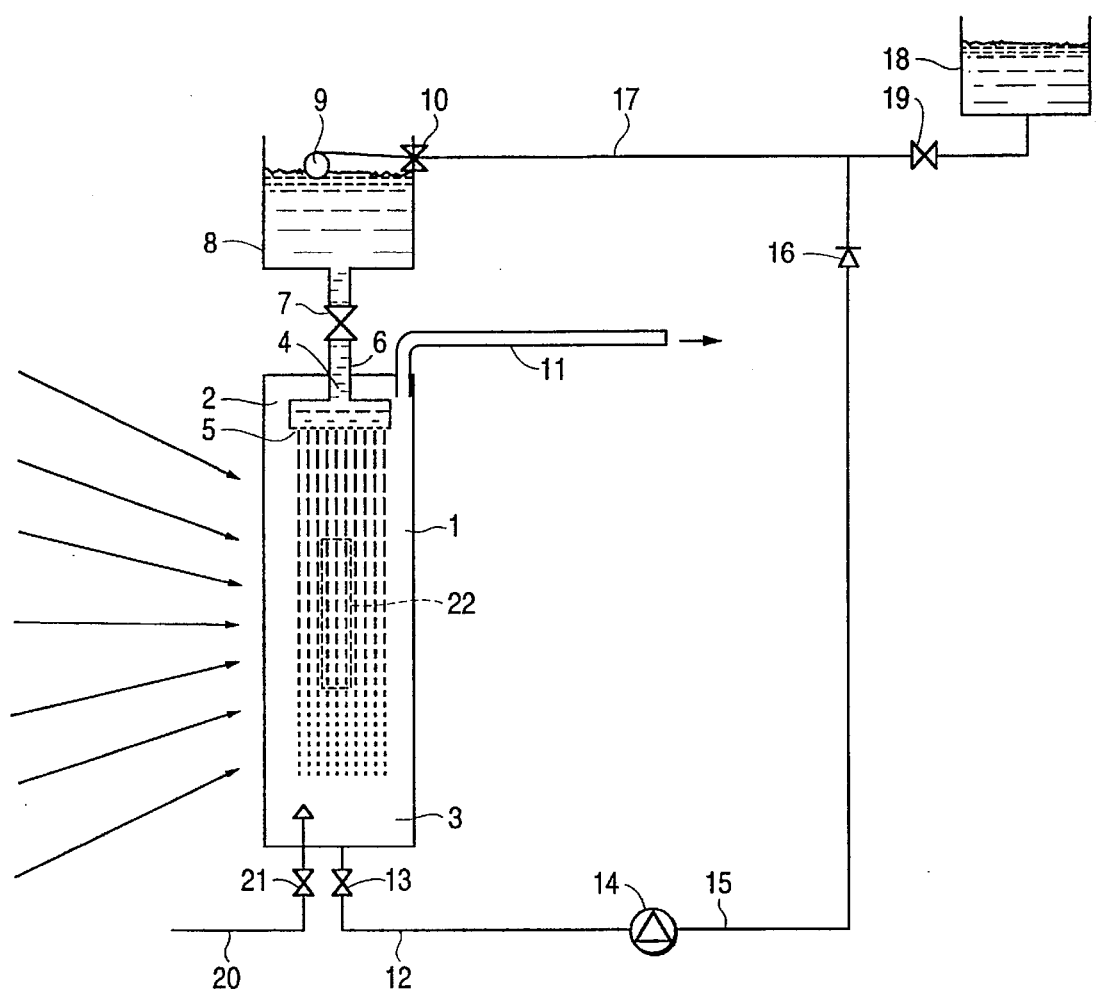
FIG. 1 is a layout of an installation according to one embodiment of the invention.
Figure 2:
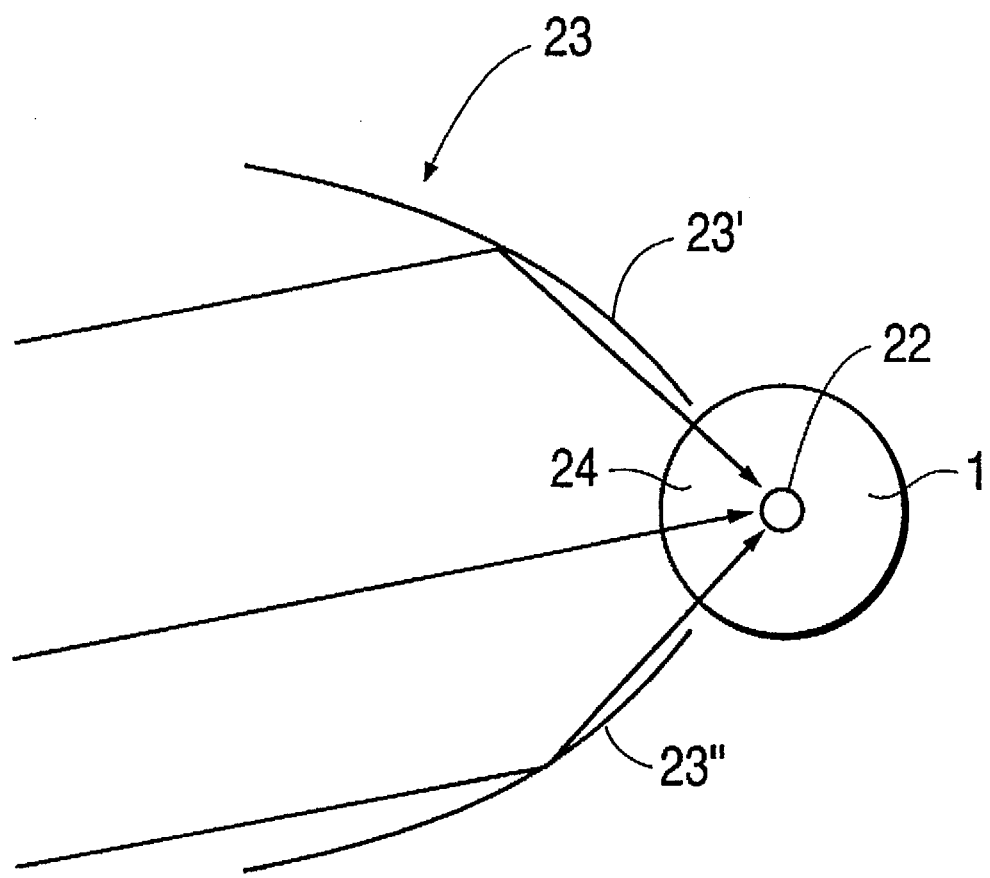
FIG. 2 is a diagrammatic section across the reactor in FIG. 1 also showing part of the solar energy concentrating system.
Figure 3:
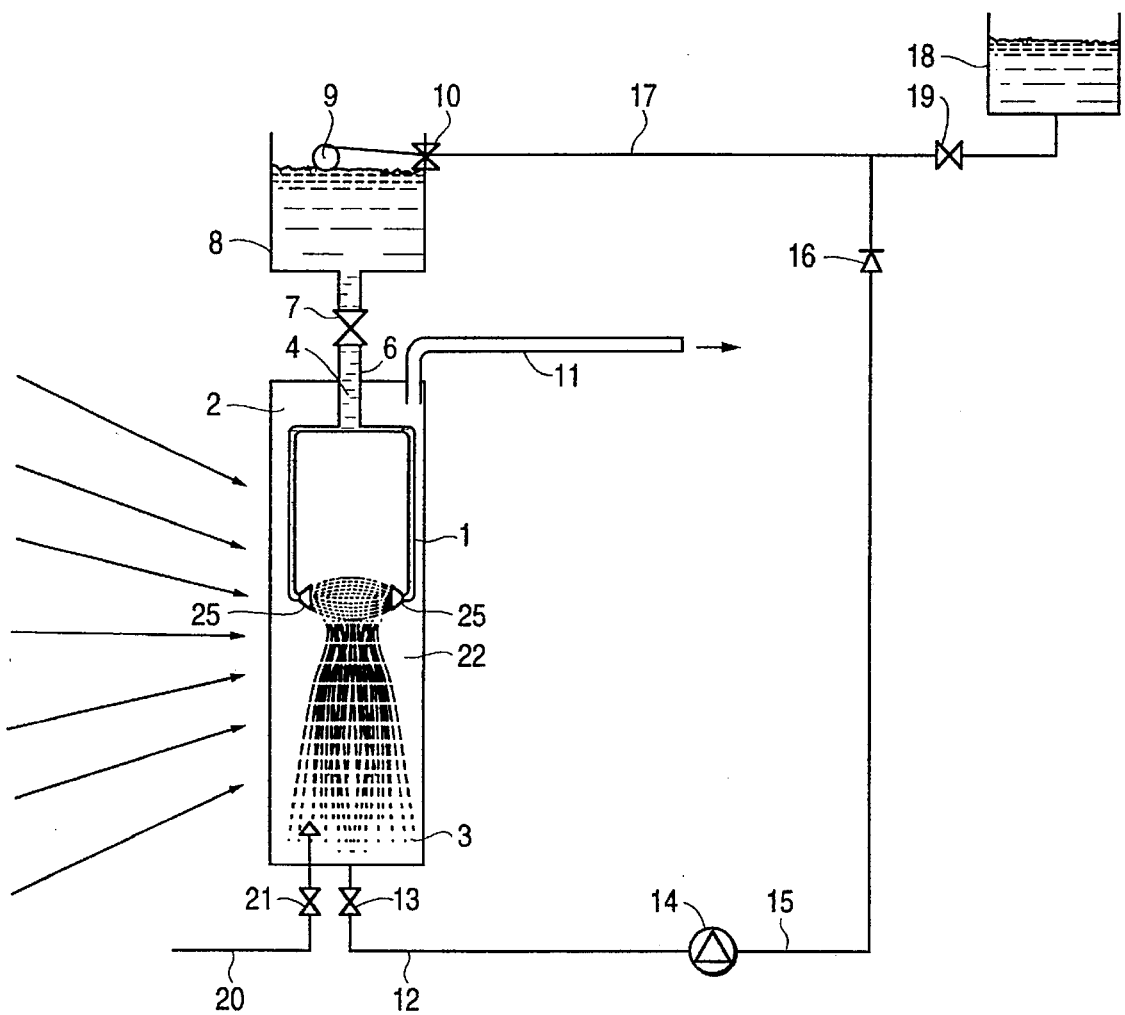
FIG. 3 is a layout of an installation according to another embodiment of the invention.

The embodiment of the installation according to the invention shown in FIGS. 1 and 2 comprises a tubular quartz reactor 1 having top and bottom regions 2 and 3. At the top end region 2 reactor 1 is fitted with a sprayer head 4 comprising a plurality of nozzles 5 and having a neck portion 6 fitted with a control valve 7 leading to an overhead constant head tank 8 fitted with a float 9 controlling an inlet valve 10. Neck portion 6 may be slidable or else telescopic whereby the level of sprayer head 4 is adjustable.

The top region 2 of reactor 1 is further fitted with an exhaust pipe 11 for the withdrawal of the product synthesis gas.

From the bottom region 3 of the tubular reactor 1 there extends a duct 12 fitted with a control valve 13 leading to a recycling pump 14 from where another duct 15 fitted with a non-return valve 16 connects to duct 17 which is fitted with a control valve 19 and links a reservoir 18 of a liquid dispersion of carbonaceous material with the constant-head tank 8 via the float-controlled inlet valve 10.

A duct 20 fitted with a control valve 21 leads into the bottom region 3 of reactor 1 and serves for the injection of a gas such as carbon dioxide or steam.

In operation reactor 1 is associated with a solar radiation high concentration system which has a focal zone 22 that is projected into the reactor as shown by way of dotted lines in FIG. 1.

The association of reactor 1 with a solar energy high concentration system is diagrammatically shown in FIG. 2. As shown, a secondary concentrator 23 having an essentially vertical opening 24, is mounted near reactor 1 in such a fashion that the two wings 23' and 23" of the secondary concentrator 23 flank the reactor 1 so that the focal zone 22 is situated in the central portion of the reactor in a region between the top and bottom regions 2 and 3.

The nozzles 5 of spray head 4 may for example be holes of 1.0–1.6 mm in diameter and suitable distanced from each other, e.g. by a distance of 5 mm between the centers of the holes so as to ensure an essentially even energy absorption by all particles. The nozzles 5 may be designed to produce individual droplet or discrete jets.

The height of the liquid phase in the constant-head tank may be controlled by suitable adjustment of valve 10. This height determines the head at which the liquid dispersion of the particulate carbonaceous material is sprayed into reactor 1 via nozzles 5.

For the performance of the process according to the invention the carbonaceous material serving as starting material has to be suitably comminuted, e.g. by grinding, so as to produce small particles whose diameter is preferably only a fraction of a millimeter.

For operation, valves 19, 7 and 13 are opened whereupon the liquid dispersion is injected or sprayed into reactor 1 at constant head. The injected liquid phase forms either droplets or discrete jets which proceed by gravity towards the bottom region 3, passing on their way through the focal zone 22 of the secondary concentrator 23. The solid particles inside the liquid droplets absorb the impinging concentrated solar radiation and are heated very rapidly to a high temperature. The bulk of the liquid surrounding the particles remains practically cold except for a thin film that envelopes the particles. This liquid film is evaporated as the vapor reacts with the solid particles and gasifies them which in case of coal leads to the formation of a synthesis gas consisting essentially of carbon monoxide and hydrogen.

If desired, gas such as steam or carbon dioxide is injected into bottom region 3 of reactor 1 via duct 20, the intensity of the injected gas being controllable by means of valve 21. Inside reactor 1 the injected gas flows countercurrently to the downflowing droplets or jets of liquid dispersion injected at the top whereby the residence time of the solid particles in the reactor is increased, the desired residence time being achieved by a judicious adjustment of valve 21. The countercurrent flowing gas also keeps the inner surface of the reactor walls clean whereby unimpeded penetration of the concentrated solar radiation is ensured.

The product synthesis gas withdrawn through exhaust pipe 11 will, as a rule, be subjected to various treatments before being charged into a suitable gasometer, such as separation of residual liquid and solid particles e.g., by way of cyclone, and if desired, also cooling.

In an experimental installation of the kind shown in FIG. 1 reactor 1 was 1 meter long and 60 mm in diameter and was placed on a moving platform adjustable both vertically and horizontally in order to ensure that the focal zone 22 remains within the central region of the reactor during all hours of the day. The nozzles 5 in spray head 4 were 1.0–1.5 mm in diameter and the distance between the centers of adjacent nozzles was 5 mm. The position of head 4 within tube 1 was adjusted by moving head 4 up and down, thereby adjusting the speed of the droplets or jets passing through the focal zone 22. In addition, the height of the liquid in the constant head tank 8 was also adjusted by suitable adjustment of the float-controlled inlet valve 10. Typical flow rates per nozzle were of the order of 50–150 cc/min.

The performance of the reactor depends on the residence time of each particle in the focal zone 22 and this is adjustable to optimal values by a counter current gas flow resulting from gas injection through duct 20. Depending on the size of the focal zone 22, the residence time can be adjusted within the range from a fraction of a second, say $\frac{1}{10}$–$\frac{1}{5}$ second, to a few seconds.

In the above described experimental installation the liquid dispersion of particulate carbonaceous material, e.g. a coal powder slurry can be prepared within the reservoir tank 18 by means of a suitable blender.

In a commercial plant an aqueous dispersion of particulate carbonaceous material, e.g. a coal powder slurry in water, can be prepared in a remote place not necessarily close to the solar site. The preparation of the slurry is done by mixing dry coal from a grinding mill with water. The slurry in the tank is kept in circulation through a pipe loop to avoid separation of solids, e.g. by means of a conventional, low pressure reciprocating pump. For operation the slurry is pumped to the solar site using a pressuring slurry pump. The slurry can be fed directly to the solar gasifier or to a head tank. Typically, a commercial plant will be designed to process 30 tons of coal per hour or 300 tons per hour of a 10 percent w/w slurry.

The solid weight content of the water dispersion depends on the type of carbonaceous material. The amount of coal in water can be varied within the range of from 1% to 50% and typically 20–25% w/w slurries are used.

Experience shows that in accordance with the invention most of the carbonaceous material introduced into the process is gasified and the method can be operated continuously practically from sunrise to sunset.

The installation of FIG. 3 is essentially similar to that of FIGS. 1 and 2 and accordingly the same reference numerals are used as before, with the exception of nozzles 5 in FIG. 1 which are replaced here by two shower-head like injectors 25 so designed as to inject into reactor 1 two bundles of droplet jets which collide in the focal zone 22.

EXAMPLES

Example 1

1. Feed Preparation

Fluka coconut charcoal was used throughout the following experiments. The charcoal was screened, and the fraction of particles having 20 to 300 micron diameter was selected. The particles were introduced into a water containing tank which was continuously agitated. The suspension formed in said tank contained typically 0.1 to 20% by weight of charcoal. The specific suspension used throughout the following illustrations contained 1% of charcoal particles having 200 micron diameter.

2. Experiment Description

The following description is made with reference to FIG. 3.

A charcoal suspension prepared as described above, was fed at a rate of 100 cc/min. to reactor 1 from the preparation reservoir 18 by a variable speed gear pump. The injection of the suspension was done via two confronting impinging injectors 25 of spray head 4, directed both to the focal zone's center. The nozzles were of hollow cone type having an orifice diameter of 2 mm. The jets were discharged into the reactor at a pressure of 150 PSI to ensure obtaining the desired residence time of the particles in the irradiated zone.

The reactor used, was a quartz windowed reactor, having 15 cm diameter window, located at the focal zone 22 of the solar furnace of the Weizmann Institute. The reactor was placed on a three-dimension moving platform which position was constantly controlled so as the focal point of the furnace will coincide with the window center. Under the above specified conditions the average exposure time at the irradiated zone was 0.4 seconds. Products were withdrawn through exhaust pipe 11, and passed through a cyclone separator followed by a water vapor trap. At least 95% of the unreacted droplets containing charcoal were collected in the cyclone separator. The flow rate of the gases leaving the water trap was measured, and gas samples were withdrawn every 6 minutes for composition analysis. The gas samples were passed through a valco valve with constant volume loops of 170 μl, and into a Gow-Mac gas chromatograph, series 150. The column used in the gas chromatograph was a ⅛" diameter one, 5 m long filled with Porapak Q 80–100 mesh.

The unreacted water droplets, accumulated at the bottom of the reactor, were removed, weighed and analyzed. The summary of the experimental results is given in the following Table I:

TABLE I

|  | Total (gr) | Water (gr) | Charcoal (gr) | $H_3$ lit. (STP) | CO lit. (STP) | $CO_2$ lit. (STP) | $CH_4$ lit. (STP) |
|---|---|---|---|---|---|---|---|
| Feed | 3000 | 2970 | 30 |  |  |  |  |
| Stream separated from the product in the cyclone | 195 | 193 | 2 |  |  |  |  |
| Stream separated from the condensor trap | 7 | 7 | — |  |  |  |  |
| Gaseous products |  |  |  | 33 | 17.8 | 12 | 0.5 |
| Stream separated from the bottom of the reactor | 2750 | 2736 | 14 |  |  |  |  |

All the above results are accumulative values for a 30 minutes' long experiment.

Example 2

A quantitative experiment followed by a theoretical analysis was conducted, in order to evaluate the mechanism involved in the solar gasification of a dispersion containing carbonaceous materials.

A very dilute dispersion containing about 0.1% charcoal (weightwise) in water was fed into the reactor of Example 1 with the exception that the feed was introduced through a nozzle located at the bottom of the reactor. The flow rate was maintained at 0.5 liter/min so as to reach a situation wherein essentially single particles pass through the focal zone, while each is being exposed to concentrated radiation for an average time interval of 2 sec. No visual changes were observed while the radiation flux was maintained at less than 5 Mw/m². However, at higher radiation fluxes, a vapor envelope surrounding the particle was formed as the layer of water surrounding the particle absorbed the heat dissipated from the particle itself, followed by instantaneous disappearance of the particle. In other words, the particle absorbs direct solar radiation whereby its temperature is raised. Simultaneously, it begins to dissipate heat to the surrounding water and in turn the water temperature is increased. However, since the heat dissipated from a particle is very limited, as compared with the heat required to raise the temperature of a much larger mass of water surrounding said particle, only a thin layer may be affected whereas the bulk of the water is retained essentially at the same temperature. As demonstrated in the above described experiment, under proper conditions, the temperature of a thin layer of water which surrounds the particle is affected and the gasification reaction between the water and the carbonaceous particle may take place. Upon completion of the reaction, the solid particle is consumed, hence the instantaneous disappearance of the particle. The gaseous products of the experiment were not collected, as the quantities evolving at a feed rate of 0.5 gr charcoal per minute were very small.

I claim:
1. A gasification process for the production of synthesis gas using solar energy, comprising:
   providing a solar gasifier reactor capable of admitting concentrated solar radiation and having top and bottom regions;
   directing concentrated solar radiation into said gasifying reactor to form a focal zone which produces a temperature sufficient for gasification therein;
   continuously injecting into said gasifying reactor an aqueous dispersion holding particulate carbonaceous material enclosed within water droplets so that the droplets pass through said focal zone for a time sufficient for the formation of synthesis gas; and
   withdrawing product synthesis gas from the reactor.

2. The gasification process of claim 1, wherein the said aqueous dispersion is injected into the top region of the gasifying reactor and the so injected particulate carbonaceous material is allowed to sink therein by gravity.

3. The gasification process of claim 2, wherein a gas stream is injected into the bottom region of the reactor to produce therein a gas flow countercurrent to the sinking particulate carbonaceous material.

4. The gasification process of claim 3, wherein the residence time of the carbonaceous material in said focal zone is controlled by the flow intensity of the injected gas.

5. The gasification process of claim 1, wherein said aqueous dispersion is injected into said focal zone in form of at least two discrete jets in an impinging jet arrangement so as to cause the droplets to collide with each other.

6. The gasification process of claim 5, wherein the residence time of the particulate carbonaceous material in said focal zone is controlled by the one or more of the arrangement of the impinging jets, adjusting the flow rate of the aqueous dispersion and the fluid pressure of the dispersion.

7. The gasification process of claim 3, wherein the injected gas is a member selected from the group consisting of steam, carbon dioxide and recycled gaseous products.

8. The gasification process of claim 1, wherein the synthesis gas produced during the process is withdrawn from the top region of the reactor.

9. The gasification process of claim 1, further comprising recycling non-reacted carbonaceous material from the bottom region of the reactor.

10. The gasification process of claim 1, wherein the carbonaceous material is a member selected from the group consisting of coal, charcoal, oil shale, biomass, waste polymeric material and mixtures thereof.

11. The gasification process of claim 1, wherein the withdrawn synthetic gas is subjected to a treatment by which unreacted particles and droplets are separated and removed.

12. The gasification process of claim 1, wherein the injected dispersion contains 1 to 50% by weight of coal.

13. The gasification process of claim 12, wherein the dispersion contains 20 to 25% by weight of coal.

14. The gasification process of claim 1, wherein no external source of steam is added to the gasifier reactor.

* * * * *

UNITED STATES PATENT AND TRADEMARK OFFICE
CERTIFICATE OF CORRECTION

PATENT NO. : 5,647,877
DATED : July 15, 1997
INVENTOR(S) : Michael EPSTEIN

It is certified that error appears in the above-identified patent and that said Letters Patent is hereby corrected as shown below:

On the cover sheet, column 1, after "item [22]", please insert -- [item 30] Foreign Application Priority Data December 26, 1991 [IL] Israel......100520--.

Signed and Sealed this

Fifteenth Day of May, 2001

Attest:

NICHOLAS P. GODICI

Attesting Officer

Acting Director of the United States Patent and Trademark Office